United States Patent [19]

Thornhill et al.

[11] Patent Number: 5,033,978
[45] Date of Patent: Jul. 23, 1991

[54] TELECOMMUNICATIONS CONNECTOR HOUSING

[75] Inventors: Royston Thornhill; Laurence Noon, both of Saskatchewan, Canada

[73] Assignee: Northern Telecom Limited, Montreal, Canada

[21] Appl. No.: 541,645

[22] Filed: Jun. 21, 1990

[51] Int. Cl.⁵ .......................................... H01R 13/66
[52] U.S. Cl. .................................. 439/540; 439/715; 174/59
[58] Field of Search ............ 174/59; 248/221.1, 221.3; 439/52, 53, 535, 540, 573, 715

[56] References Cited

U.S. PATENT DOCUMENTS 4,220,391  9/1980  Krolak et al. ................... 439/540
4,591,949  5/1986  Lahr .................................. 439/715
4,611,879  9/1986  Bullard ............................. 439/715

Primary Examiner—Paula A. Bradley
Attorney, Agent, or Firm—R. J. Austin

[57] ABSTRACT

A connector housing for telecommunications cable with accompanying connector and optical fiber storage fittings. Each fitting and a wall of the housing has interconnectable mounting elements. These are in the form of pegs, which are preferably on each fitting, and bores in the wall of the housing. The pegs are a friction fit within the bores and the arrangement is such that any fitting may be disposed in many desired locations on the wall and many combinations of fittings may be used within the housing dependent upon the end use of the connector.

3 Claims, 3 Drawing Sheets

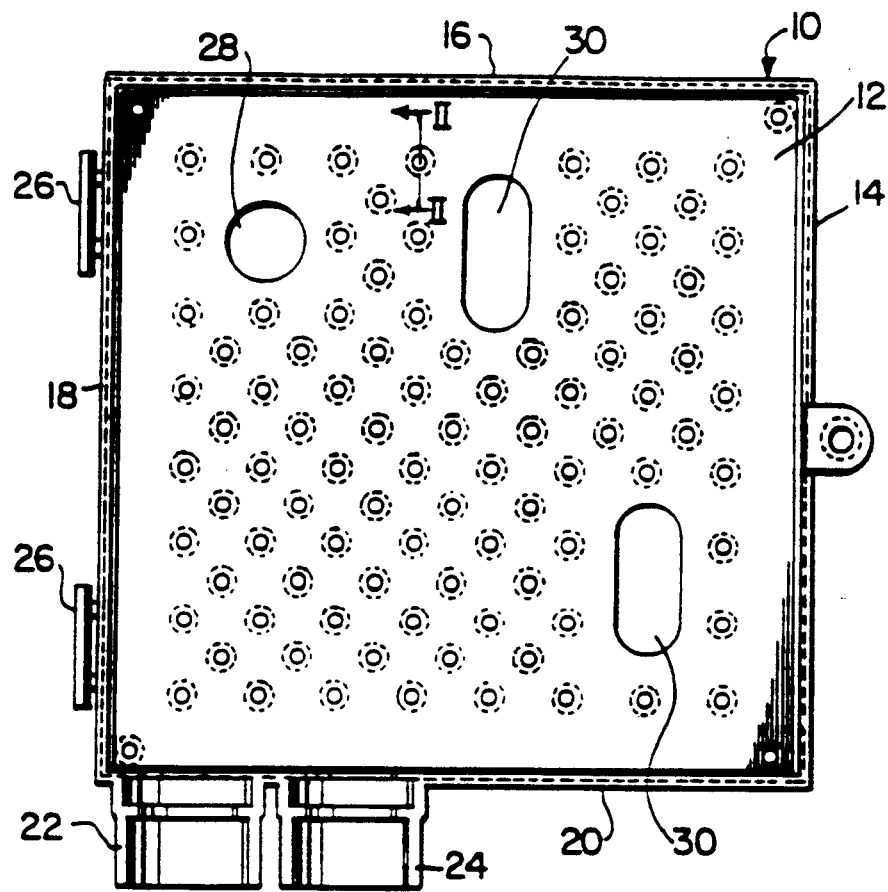
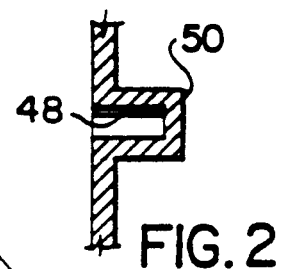
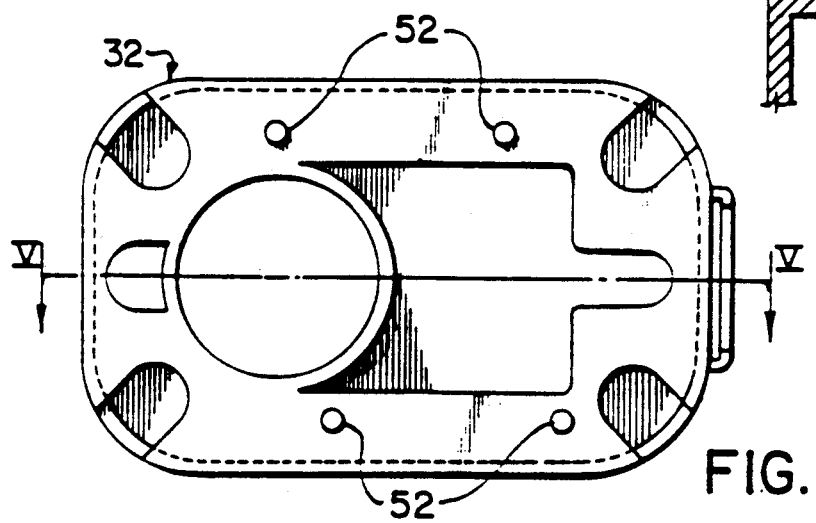
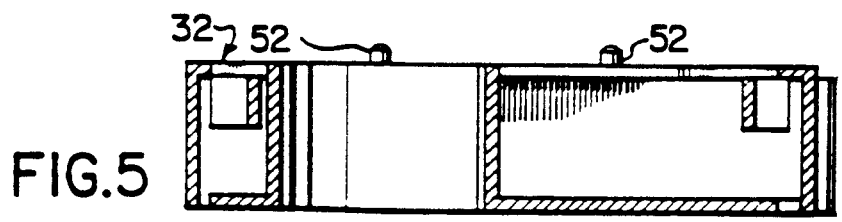

TELECOMMUNICATIONS CONNECTOR HOUSING

This invention relates to telecommunications connector housings.

In the telecommunications field, service is provided to a building by conductors of an incoming cable which are connected to conductors of another cable provided within the building. Such connections are made within a wall mounted housing referred to herein as a "connector housing". Connector housings are of many designs to suit particular requirements of various telecommunications installation companies who have various methods of directing incoming cable into a building and of making suitable connections. The design situation with regard to connector housings is further complicated in that incoming telecommunications cables now include both optical fibers and copper conductors in a single incoming cable. Designs of connector housings thus have provision for connections both for optical fibers and copper conductors. In cases where there is no present requirement for optical signal transmission, provision is alternatively made for storing end portions of the incoming optical fibers within a connector housing for future use. For this purpose, an incoming cable, which may basically be an optical fiber cable, includes insulated copper conductors which are initially used for telecommunications service until the need arises for use of the optical fibers. In one manner of allowing for this change, the incoming optical fibers are initially stored within a compartment in a lid of the connector housing with the incoming copper conductors extending to connectors in another and main compartment of the housing. When it is required to use the optical fibers instead of the copper conductors, the latter are disconnected and cut short as they enter the housing, and the stored optical fiber end portions are removed from the lid compartment to replace the copper conductors in the main compartment and optical connections are made. This procedure calls for major changes of connector parts within the housing while the copper conductors are thereafter permanently wasted although they still remain along the full length of incoming cable. Conventional connector housings are therefore of extremely restricted use.

Alternatively, if it is required after initial installation to supply both optical signals and electrical power, e.g. for operating monitoring meters for such services as gas, water and electricity, a single incoming cable may be used, but the connector housing needs to be different in construction from that required to connect copper conductors while storing optical fibers for future use. Hence, there is now a need for a connector housing of a single construction which may be used alternatively for optical or electrical transmission requirements, or alternatively for optical transmission and electrical power requirements. Ideally, after installation, connector fittings within such an installation should be easily changeable in position or replaced to suit the requirements of different telecommunication installation companies or also to enable the housing to be adapted for different transmission or power connection requirements.

The present invention provides a telecommunications connector housing and conductor handling fittings (such as conductor connectors or optical fiber storage fittings) for the housing which will enable the above problems to be minimized or even avoided.

Accordingly, the present invention provides a connector housing and a plurality of conductor handling fittings for the housing wherein the connector housing has a mounting wall for the fittings, each of the fittings and the mounting wall between them having mechanically interconnectable mounting means for mounting the fitting upon the mounting wall, with the mounting means on the mounting wall being located to enable each fitting to be detachably mounted upon the mounting wall in a plurality of different positions.

With a housing in the inventive structure, two or more fittings may be disposed alternatively in different relative positions upon the wall, these positions being changeable as required; alternatively, certain fittings may be replaced by other fittings which include the mounting means.

With the above structure according to the invention, in one arrangement in use, a terminal block for copper telecommunications conductors is provided as one of the fittings while lightning protectors for the conductors are mounted upon another fitting, i.e. lightning protector holder. A further fitting is provided as an optical fiber storage member. When it is later desired to provide connections for the optical fibers for optical transmission into the building, terminal connections may be made either upon the fiber storage member if this is designed for this purpose, or another fitting may be added for optical fiber connections. The fitting for the optical fiber connections may alternatively be used as a replacement fitting for the terminal block and the lightning protective holder for the copper telecommunications conductors. Instead, however, use of the copper conductors may be changed so that they are provided as power conductors for providing power to various use monitoring meters. Alternatively, the same connector housing may be initially installed while providing both optical fiber telecommunications services and electrical power services by having appropriate designs of fittings initially located upon the mounting wall.

In a preferred structure, the mounting means of the connector housing and a fitting comprises a plurality of bores and pegs, the pegs being frictionally engageable within the bores. The bores are preferably formed upon the mounting wall while the pegs are provided upon each fitting. However, the location of the bores and pegs may be reversed. It is also preferable that the mounting means on the mounting wall are disposed in two series of rows normal to each other with the bores located equal distances apart in each row. With this arrangement each fitting may be changed not only in position, but also in direction of orientation.

It is also preferable that the mounting wall is a rear wall of the housing and the bores are blind bores having inner ends spaced from an outer surface of the rear wall.

One embodiment of the invention will now be described, by way of example, with reference to the accompanying drawings, in which:

FIG. 1 is a front elevational view of a connector housing of the embodiment with a front cover removed;

FIG. 2 is a cross-sectional view through part of the connector housing of FIG. 1 taken along line II—II in FIG. 1 and to a larger scale;

FIG. 4 is a plan view of one of the conductor handling fittings used in the assembly of FIG. 3 and to a larger scale;

FIG. 5 is a cross-sectional view through the fitting of FIG. 4 taken along line V—V in FIG. 4;

Figure 3:
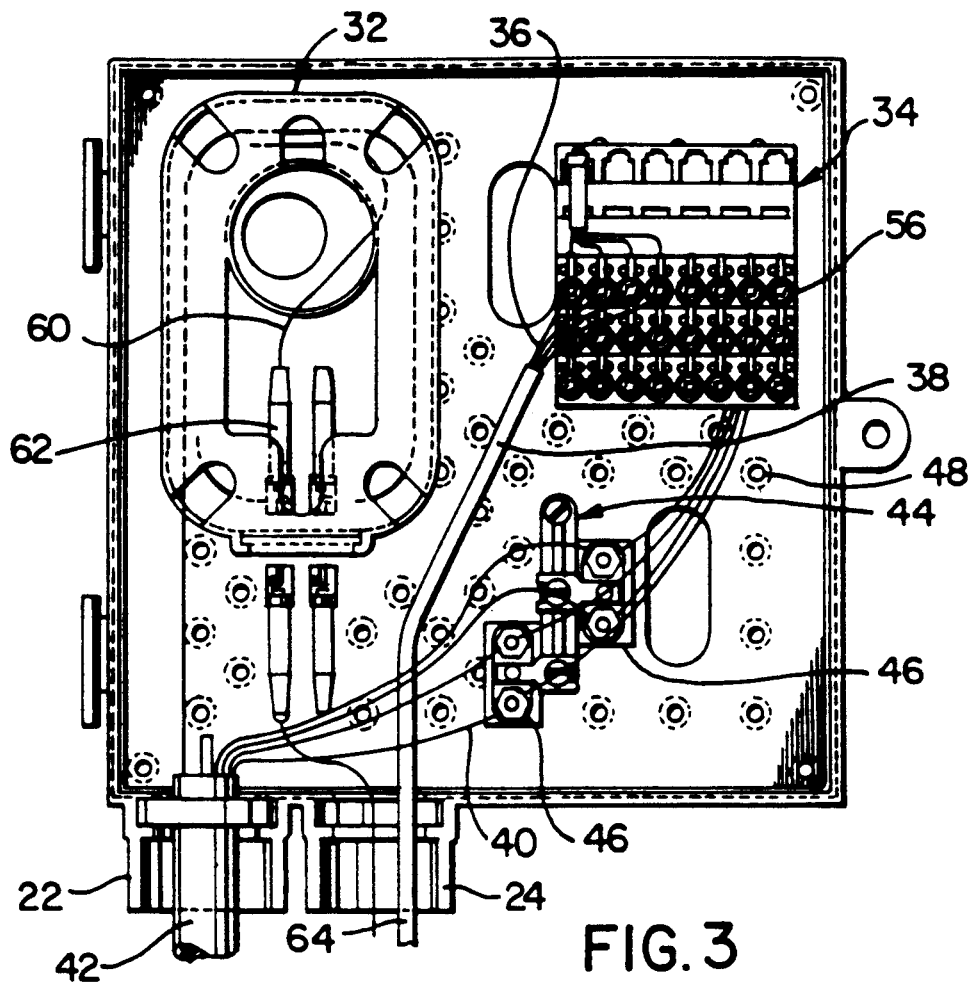
FIG. 3 is a view similar to FIG. 1 of the connector housing forming part of a connector housing and conductor handling fitting assembly.

As shown in FIG. 1, a connector housing 10 for connecting incoming telecommunications cable with a cable provided inside the building comprises a base wall 12 for mounting the housing upon a wall of the building. Extending outwardly from the wall so as to define a chamber with the wall and a front cover (not shown) are four side walls 14, 16, 18 and 20. A lower side wall 20 is provided with an inlet port 22 for the incoming cable and an outlet port 24 for the building inside cable. Further cable ports 26 are provided in spaced positions upon the side wall 18 for use to suit particular installation requirements of telecommunications installation companies or for particular types of entry and exit cables. The base wall 12 is formed with a substantially circular panel 28 and two substantially rectilinear panels 30, the panels being attached to the base 12 by weakened peripheral regions so as to enable panel removal as required for passage of conductors into and out of the housing. Such panels are normally referred to as "knock-out" panels in the industry.

For use with the housing 10, there are provided a plurality of conductor handling fittings. In FIG. 3, three of these fittings are shown installed within the housing 10 to provide a total assembly of a connector housing and fittings to provide particular functions with appropriate conductors of incoming and outgoing cables connected and stored within the housing.

More precisely, one of the fittings 32 is a storage spool for optical fibers. Another fitting 34 is a terminal block for connecting individually insulated telecommunications conductors 36 of an inside cable 38 with similar conductors 40 of an incoming cable 42 which extends into the inlet port 22. Between the terminal block 34 and the incoming cable 42 is disposed a fitting in the form of a lightning protector holder 44 which carries lightning protectors 46 disposed in the incoming line to the cable 42.

Figure 10:
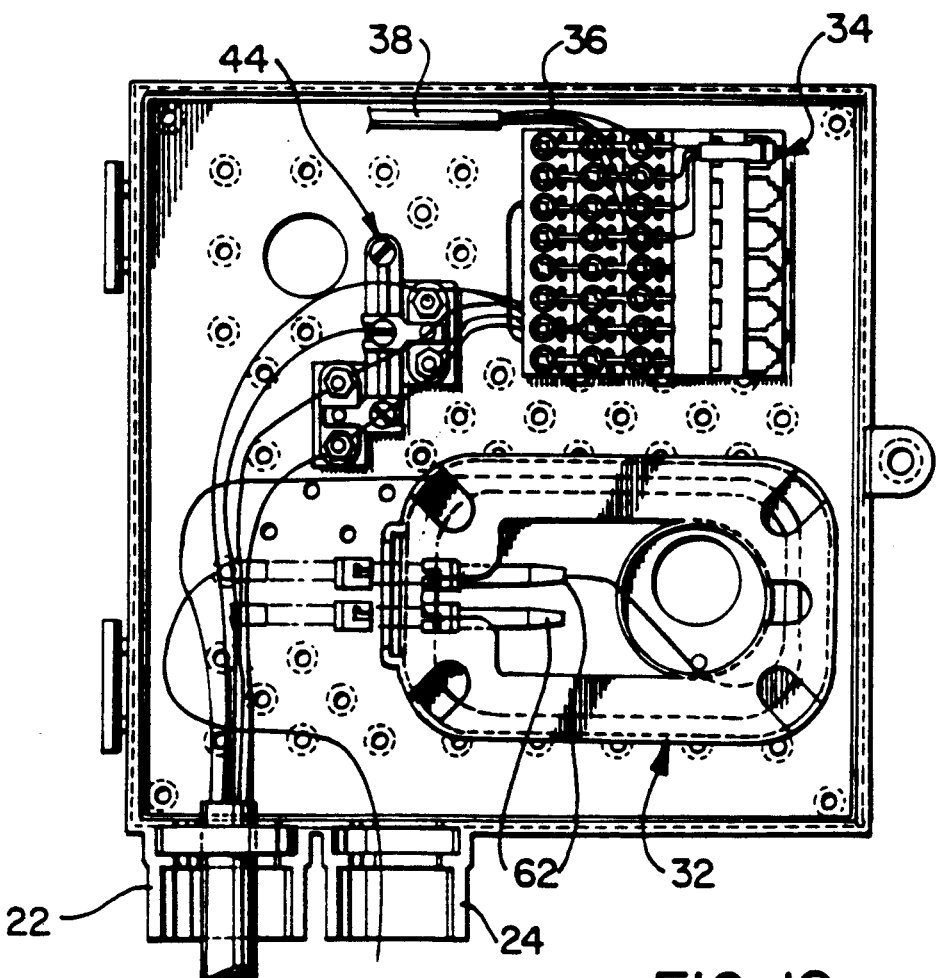
FIG. 10 is a view similar to FIG. 3 of an assembly of the connector housing and fittings according to a different arrangement from that shown in FIG. 3.

The fittings 32, 34 and 44 are basically of conventional construction except a feature which allows for their attachment to the housing 10. For purposes of connecting each of the fittings 32, 34 and 44 to the housing, the fitting and the rear wall 12 of the housing have, between them, mechanically interconnectable mounting means which enables the fitting to be placed upon the mounting wall in any of a plurality of different positions. In the case of the connector housing, the interconnectable mounting means comprises a plurality of bores 48 which are arranged in substantially equal spaced-apart positions, except where interrupted by the panels 28 and 30, in spaced-apart horizontal and vertical rows. As shown particularly by FIG. 2, these bores 48 extend into bosses 50 projecting rearwardly from the base wall 12 so as to open forwardly into the connector chamber defined by the wall 12 and the side walls 14, 16, 18 and 20. As shown by a rear view of the storage spool 32 in FIG. 4 and also in FIG. 5, the spool 32, which is a plastics molding, is integrally formed with four pegs 52 extending outwardly from its rear surface. These pegs 52 have such a diameter as to be frictionally engageable within any of the holes 8 of the housing 10. In addition, the pegs are spaced apart distances such that the spool 32 may be located anywhere in a vertical position upon the rear wall 12, e.g. such as shown in FIG. 3, or alternatively in any horizontal position, e.g. as shown in FIG. 10.

Figures 6, 7:
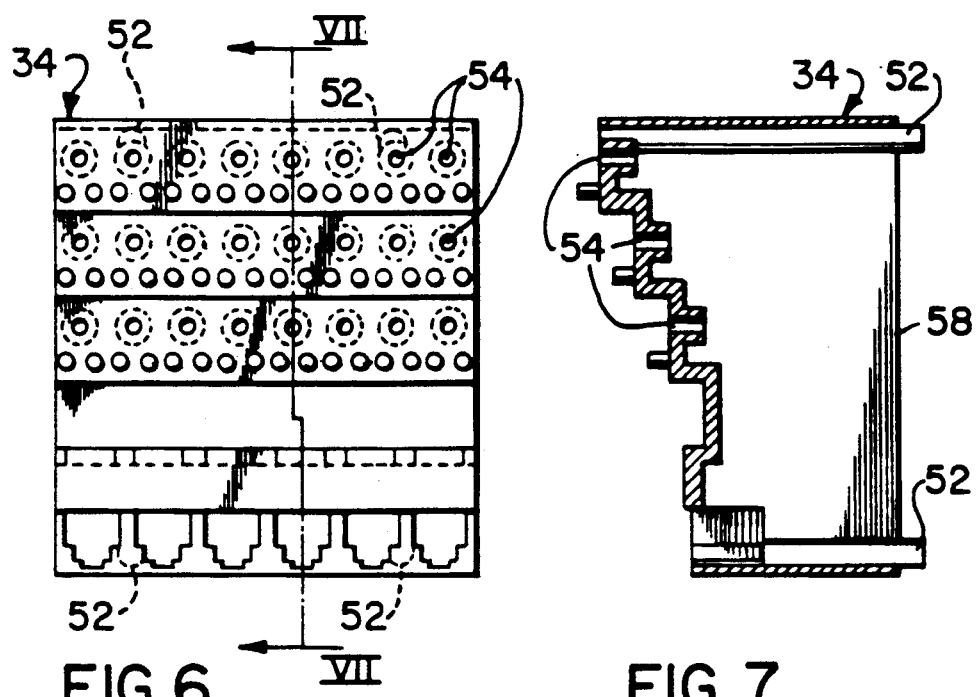
FIG. 6 is a plan view of another fitting used in the assembly of FIG. 3 and also to a larger scale.
FIG. 7 is a cross-sectional view through the fitting of FIG. 6 taken along line VII—VII in FIG. 6.

The terminal block 34, as shown in FIG. 6, has terminal screw holes 54 for acceptance of terminal screws 56 (see FIG. 3) in a conventional manner. As shown by FIG. 7, a rear face 58 of the terminal block 34 is formed with four pegs 52 of similar size to those of the storage spool 32. The pegs 52 on the terminal block 34 are also spaced to enable the block to be disposed in any position within the housing according to a first angle of orientation as shown in FIG. 3 or according to another angle of orientation normal to the first angle of orientation as shown in FIG. 10.

Figure 8:
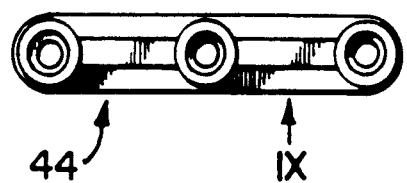
FIG. 8 is a plan view of yet a further fitting used in the assembly of FIG. 3 and to a larger scale than FIG. 3.
Figure 9:
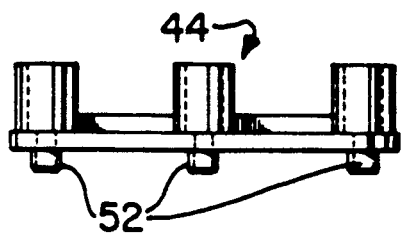
FIG. 9 is a side elevational view of the fitting of FIG. 8 taken in the direction of arrow IX in FIG. 8.

Similarly, the holder 44, which is shown in FIGS. 8 and 9, has three spaced-apart pegs 52 extending from the rear face for purposes of locating the holder in any desired location in either of two positions of orientation at right-angles to each other.

Other fittings (not shown) and which provide different conductor handling functions may also be used within the connector housing dependent upon requirements. Each of such fittings will also be provided with pegs 52 to enable the fitting to be located in any desired position within the housing.

The arrangement of fittings and the design of fittings to be used within the housing is, of course, dependent upon requirements. However, the housing and fitting structures allow for a particular telecommunications installation company to decide the positioning of the fittings. In one method of forming an assembly of connector housing and fittings as shown in FIG. 3, and using the fittings which have been described, the storage spool 32 is disposed vertically above the two ports 22 and 24 for storing any desired number of lengths of optical fiber 60. Terminal block 34 is disposed towards the top right-hand side of the housing in one position of orientation and the holder 44 towards the lower side wall 20. These fittings are appropriate for the use of electrical conductors as a telecommunications supply media with the optical fibers stored for future use. Alternatively, the same housing and the same fittings may be disposed in different positions from that shown in FIG. 3, e.g. as shown in FIG. 10. With this arrangement the same uses for the electrical conductors and the optical fibers may result.

With the arrangement of fittings as shown in either of FIGS. 3 or 10, it is quite a simple matter, should it be required to change the telecommunications signal supply from copper conductors to optical fibers for the optical fibers 60 to be connected, for instance, by connectors 62, with optical fibers 64 of a cable which extends into the building. In this case, the copper conductors may be completely disconnected from any service as is conventional with such a changeover. Alternatively, the copper conductors 40 may be used instead to conduct power to any suitable low powered device within the building such as monitoring meters for monitoring usage of services such as gas, water or electricity. For this purpose it may be necessary to exchange the terminal block 34 and the fitting 44 for other fittings (not described) to be mounted in the housing 10 and which are more suitable for connecting the electrical conductors 40 to their associated units within the building.

As the above embodiment shows, with the interconnectable mounting means provided between the connector housing and the fittings any design and type of fitting having the appropriate mounting means may be assembled into the housing. Hence, the housing together with a multiplicity of conductor handling fittings may be used for a multitude of different electrical purposes while thus avoiding the use of connector housings of different construction.

What is claimed is:

1. A connector housing and a plurality of conductor handling fittings for the housing wherein the connector housing has a mounting wall for the fittings, the mounting wall being formed with a plurality of bores which are located in two series of rows normal to each other, and each of the fittings is provided with a plurality of pegs which are located to enable the fitting to be detachably mounted upon the wall in a plurality of different positions by frictional engagement of the pegs within chosen bores in the two series of rows.

2. A connector housing and a plurality of conductor handling fittings for the housing wherein the connector housing has a mounting wall for the fittings, the mounting wall being formed with a plurality of bores and each fitting having a plurality of pegs for frictional engagement within the bores, the bores and the pegs being disposed distances apart to enable each fitting to be disposed in a plurality of different positions and angles of orientation upon the wall.

3. A connector housing and a plurality of fittings according to either claim 1 or claim 2 wherein the mounting wall is a rear wall of the housing and the bores are blind bores which open at a front face of the rear wall.

* * * * *